United States Patent [19]

Stricklen et al.

[11] 4,374,234

[45] Feb. 15, 1983

[54] SMALL AMOUNTS OF ALUMINUM ALKYL OR DIHYDROCARBYL MAGNESIUM IN SLURRY OLEFIN POLYMERIZATION

[75] Inventors: Phil M. Stricklen; John P. Hogan, both of Bartlesville, Okla.

[73] Assignee: Phillips Petroleum Company, Bartlesville, Okla.

[21] Appl. No.: 266,691

[22] Filed: May 22, 1981

[51] Int. Cl.³ .............................. C08F 4/46; C08F 4/78
[52] U.S. Cl. ..................................... 526/105; 526/64; 526/65; 526/348.2; 526/352
[58] Field of Search ............................................. 526/105

[56] References Cited

U.S. PATENT DOCUMENTS

| | | | |
|---|---|---|---|
| 3,351,623 | 11/1967 | Walker et al. | 260/94.9 |
| 3,658,777 | 4/1972 | Green | 260/88.2 R |
| 3,704,287 | 11/1972 | Johnson | 260/94.9 DA |
| 3,891,611 | 6/1975 | Abe et al. | 526/105 |
| 3,919,185 | 11/1975 | Takebe et al. | 526/105 |
| 3,947,433 | 3/1976 | Witt | 260/88.2 R |
| 3,956,257 | 5/1976 | Hogan | 526/64 |
| 4,146,695 | 3/1979 | van de Leemput | 526/105 |

Primary Examiner—Stanford M. Levin

[57] ABSTRACT

Small amounts of an aluminum alkyl or a dihydrocarbylmagnesium compound are used in slurry olefin polymerization employing a silica supported chromium catalyst in order to reduce the induction period and increase catalyst activity while having only a modest effect on polymer properties.

11 Claims, No Drawings

SMALL AMOUNTS OF ALUMINUM ALKYL OR DIHYDROCARBYL MAGNESIUM IN SLURRY OLEFIN POLYMERIZATION

BACKGROUND

Supported chromium oxide catalysts have become an important vehicle for polymerization of 1-olefins such as ethylene and predominantly ethylene copolymers. As originally commercialized, these polymerizations were carried out under solution conditions. However, it was early recognized that a more economical route to such polymers was to utilize a slurry system, sometimes called a particle form system, wherein the polymerization is carried out at a low enough temperature that the resulting polymer is insoluble in the diluent. It is highly desirable in slurry polymerization systems to achieve relatively high productivity. This goal is hampered to some extent by the fact that silica supported chromium oxide catalysts tend to have an induction period under slurry conditions. This is particularly disadvantageous in a slurry system utilizing a loop type reactor with a settling leg for polymer recovery.

SUMMARY OF THE INVENTION

It is an object of this invention to reduce or eliminate the induction period in silica supported chromium catalyzed polymerization of ethylene and ethylene copolymers;

It is a further object of this invention to provide an improved chromium oxide catalyst system for olefin polymerization;

It is still yet a further object of this invention to both reduce the induction period and increase catalyst activity; and It is yet a further object of this invention to provide an improved olefin polymerization process.

In accordance with this invention, an olefin monomer comprising ethylene is polymerized under slurry conditions utilizing a silica supported chromium oxide catalyst in the presence of a small amount of an aluminum alkyl or a dihydrocarbylmagnesium compound as a reactor adjuvant.

DESCRIPTION OF THE PREFERRED EMBODIMENTS

The polymerization process in accordance with this invention is carried out under slurry or particle form conditions as disclosed, for instance, in Norwood, U.S. Pat. No. 3,248,179, issued Apr. 26, 1966, the disclosure which is hereby incorporated by reference. Briefly, this can be accomplished, for example, by conducting the polymerization in the presence of a dry inert hydrocarbon diluent such as isobutane, n-heptane, methylcyclohexane, or benzene at a reactor temperature within the range of about 60° to about 110° C. and a reactor pressure of about 1.7 to about 4.1 MPa (250 to 600 psia). The polymer can be recovered, treated with $CO_2$ or $H_2O$, for example, to deactivate residual catalyst, stabilized with an antioxidant, such as butylated hydroxytoluene (BHT), and dried by conventional methods to obtain the final product. Hydrogen can be used in the reactor as known in the art to provide some control of the molecular weight of the polymer. The polymerization can be conducted batchwise in a stirred reactor or continuously in a loop reactor with or without a settling leg or in a series of reactors.

The process of this invention is suitable for the production of normally solid ethylene homopolymer and also for the production of predominantly ethylene copolymer. Ethylene can be copolymerized with one or more higher aliphatic mono-1-olefins containing from 3 to about 10 carbon atoms such as propylene, 1-butene, 1-pentene, 1-hexene, 1-octene and/or a conjugated diolefin containing 4 to about 12 carbon atoms. In such polymers, the ethylene content generally ranges from about 97 to 99.6 weight percent which is obtained using from about 93 to 99.6 weight percent ethylene monomer, the remainder being said higher olefin comonomer. Broadly, ethylene copolymers can be made using 80 to 99.8 weight percent ethylene and 20 to 0.2 weight percent comonomer in the feed.

The catalyst system to which this invention applies is a supported chromium oxide system as disclosed in Hogan et al, U.S. Pat. No. 2,825,721, issued Mar. 4, 1958, the disclosure of which is hereby incorporated by reference. The support for the chromium oxide is a silica-containing material and can be selected from catalytic grade silica, silica-alumina, silica-boria, silica-titania, silica-zirconia, and mixtures thereof in which the silica constitutes from 80 to 100 weight percent preferably greater than 90 weight percent of the silica-containing material. Preferably, the support is a cogel, that is, a silica produced by coprecipitating titanium and silica as disclosed in Dietz, U.S. Pat. No. 3,887,494, issued June 3, 1975, the disclosure of which is hereby incorporated by reference. For instance, this cogel formation can be carried out by adding a titanium compound to a mineral acid, introducing an alkali metal silicate into the acid containing said titanium compound to form a hydrogel, aging the hydrogel for a time of greater than one hour, washing the thus aged hydrogel to produce a substantially alkali metal free hydrogel, forming a mixture comprising the thus washed hydrogel and a normally liquid oxygen-containing water soluble organic compound, and separating said organic compound in water from said mixture to form a xerogel. The titanium is present in these cogels in an amount within the range of 0.1 to 10, preferably 0.5 to 5 weight percent titanium based on the weight of the dried cogel (xerogel).

The final solid catalyst contains chromium generally in an amount from 0.001 to 10, preferably 0.1 to 5, more preferably 0.5 to 1 weight percent chromium based on the weight of the silica-containing base. The chromium can be added initially as $CrO_3$, or a lower valent chromium compound can be added and thereafter the composite activated in a conventional manner as known in the art for the particular type of chromium compound used. Preferably, the composite is activated by contact with an oxygen-containing ambient, such as air, at temperatures ranging from 500° to 1000° C. Even if $CrO_3$ is utilized as a chromium source, the activation treatment is generally utilized.

In the aluminum alkyl embodiment of this invention, the aluminum alkyl is a compound of the formula $R_3Al$ or $R_2AlH$ where R is an alkyl radical of 1 to 20, preferably 2 to 4 carbon atoms. The preferred compound is triethylaluminum (TEA). Trimethylaluminum (TMA) is less preferred. Other suitable compounds of the formula $R_3Al$ include tripropyl-aluminum, tributylaluminum and trieicosylaluminum, for example. Suitable compounds of the formula $R_2AlH$ include dimethylaluminum hydride, methylethylaluminum hydride, diethylaluminum hydride and dieicosylaluminum hydride, for example.

In the dihydrocarbyl magnesium embodiment of this invention, a compound of the formula R'$_2$Mg is used wherein each R' can be the same or different and is a hydrocarbyl radical having 2 to 12, preferably 2 to 6 carbon atoms. A particularly suitable compound is n-butylethylmagnesium (BEM). Other suitable compounds include diethylmagnesium, dipropylmagnesium, dibutylmagnesium, dipentylmagnesium, dihexylmagnesium and didodecylmagnesium. These compounds are not Grignards, i.e., they are not produced in the presence of an ether. Functionally, any R'$_2$Mg compound soluble in the diluent used can be utilized.

The aluminum alkyl or dihydrocarbylmagnesium compound treating agent is used in any amount which is effective to reduce the induction period but preferably in an amount within the range of an effective amount up to 5 parts per million, most generally within the range of 0.1 to 1 part per million. More preferred is about 0.2 to 1 part per million. A range of 0.3 to 0.7 is particularly desirable because of the dramatic effect produced at such a low concentration. The reference herein to parts per million is based on parts by weight of the treating agent based on the weight of the diluent. At levels of about 1 part per million or less, massive reductions in the induction period are achieved with little or only modest alteration of polymer properties. At higher concentrations, polymer properties such as melt index, density and molecular weight distribution may be altered substantially.

In the following examples, the polymerization reactions were conducted in a stainless steel 3-liter stirred reactor. Ethylene was added on demand through a calibrated rotameter to maintain a constant pressure.

Induction time is defined as that time required, after the desired pressure with ethylene addition has been obtained, until the first movement of the rotameter ball is noted indicating polymerization is starting. Pressurization with ethylene took 10 minutes in each instance. Total run time is induction time, if any, plus actual polymerization time.

When used, each metal alkyl as a dilute solution in n-hexane was added to the isobutane diluent prior to charging the monomer. It can be added before, during, or after charging the catalyst. By dilute solution is meant about 0.01 molar. For example, the TEA was 0.0108 molar, the TMA was 0.00918 molar, and BEM was 0.00413 molar.

EXAMPLE I

Silica-titania cogel catalyst containing about 1 weight percent chromium as chromium oxide and about 2 weight percent titania, each based on the weight of the composition, was air activated at 870° C. (1600° F.) for 5 hours in dry air and used in particle form ethylene polymerization at a reactor temperature of 107° C. (225° F.), a reactor pressure of 3.89 MPa (565 psia) and in the presence of 635 g (1.4 L) of isobutane diluent. In the various runs about 0.03–0.08 g catalyst (weighed) was charged to the reactor. A solution of trimethylaluminum (TMA) was also charged to the reactor in the amounts shown. Generally a run was conducted for a period of time estimated to yield about 4,000 g polyethylene per g catalyst. The results are given in Table I.

TABLE I

| Run No. | Time, Minutes Induction | Time, Minutes Total | TMA Conc. ppm. | Polymer Yield g | Polymer Density g/cc | Polymer Melt Index g/10 min. | Catalyst Productivity g/g cat. | Calculated Average Catalyst Activity g/g Cat/hr |
|---|---|---|---|---|---|---|---|---|
| 1 | 4 | 42 | None | 168 | 0.9668 | 4.0 | 4180 | 5970 |
| 2 | 0 | 45 | 0.25 | 171 | 0.9670 | 3.4 | 4200 | 5600 |
| 3 | 0 | 37 | 0.50 | 175 | 0.9658 | 3.4 | 3900 | 6320 |
| 4 | 0 | 37 | 1.10 | 170 | 0.9662 | 3.4 | 4130 | 6700 |

This example shows the induction period to be essentially eliminated with no significant change in polymer properties such as melt index and density. Activity is improved only a small amount but this is believed to be because the control run with no adjuvant was high in activity for some unexplained reason. Example IV, Run 2 is more representative of the improvement in activity which is obtained in accordance with this invention.

EXAMPLE II

An identical catalyst was utilized under identical polymerization conditions except that a solution of triethylaluminum (TEA) was employed as an adjuvant. The results were as follows:

TABLE II

| Run No. | Time, Minutes Induction | Time, Minutes Total | TEA Conc. ppm. | Polymer Yield g | Polymer Density g/cc | Polymer Melt Index g/10 min. | Catalyst Productivity g/g Cat. | Calculated Average Catalyst Activity g/g Cat/hr |
|---|---|---|---|---|---|---|---|---|
| 1 | 5 | 45 | None | 178 | 0.9665 | 4.1 | 4050 | 5400 |
| 2 | 0 | 31 | 0.30 | 180 | 0.9650 | 3.2 | 4120 | 7970 |
| 3 | 0 | 34 | 0.50 | 179 | 0.9650 | 3.8 | 4200 | 7410 |
| 4 | 0 | 31 | 0.70 | 184 | 0.9652 | 4.4 | 3900 | 7550 |
| 5 | 0 | 31 | 0.96 | 160 | 0.9654 | 3.7 | 3620 | 7010 |

Catalyst activity is substantially improved with generally little change in polymer properties relative to the control. Examples IV and V hereinafter show even more dramatic improvement in activity.

EXAMPLE III

An identical catalyst was utilized under identical polymerization conditions except that a solution of n-butylethylmagnesium (BEM) was employed as an adjuvant. The results were as follows:

TABLE III

| Run No. | Time, Minutes Induction | Time, Minutes Total | BEM Conc. ppm. | Polymer Yield g | Polymer Density g/cc | Polymer Melt Index g/10 min. | Catalyst Productivity g/g Cat. | Calculated Average Catalyst Activity g/g Cat/hr |
|---|---|---|---|---|---|---|---|---|
| 1 | 10 | 55 | none | 216 | — | 3.9 | 4240 | 4630 |
| 2 | 0 | 35 | 1.00 | 240 | — | 3.4 | 4290 | 7350 |

Catalyst activity is substantially improved while little change is noted in polymer melt index relative to the control. Polymer density was not determined.

EXAMPLE IV

Davison 969 MS catalyst containing 1 weight percent chromium as chromium oxide, the remainder being silica, was air activated at 816° C. (1500° F.) for 6 hours and used to produce polyethylene under identical polymerization conditions in the absence, and in separate runs, in the presence of one of 0.50 ppm of TMA, 0.50 ppm TEA and 0.50 ppm (triethylborane (TEB) as reactor adjuvant. The results were as follows:

TABLE IV

| Run No. | Time, Minutes Induction | Time, Minutes Total | Metal Alkyl | Polymer Yield g | Polymer Density g/cc | Polymer Melt Index g/10 min. | Catalyst Productivity g/g Cat. | Calculated Average Catalyst Activity g/g Cat/hr |
|---|---|---|---|---|---|---|---|---|
| 1 | 35 | 78 | none | 176 | 0.9665 | 0.48 | 4000 | 3080 |
| 2 | 1 | 42 | TMA | 225 | 0.9614 | 0.32 | 4120 | 5890 |
| 3 | 0 | 39 | TEA | 246 | 0.9610 | 0.30 | 4430 | 6820 |
| 4 | 0 | 66 | TEB | 221 | 0.9616 | 0.40 | 4000 | 3640 |

In this series with a silica supported chromium oxide catalyst, TEB provided little improvement in catalyst activity while TMA and TEA each provided great improvement. Each metal alkyl depressed polymer density slightly more than in the other runs for some unexplained reason but the density was still not depressed below typical homopolymer density.

EXAMPLE V

Catalyst identical to that of Example IV except that it was activated at 1400° F. was employed in polymerizing ethylene containing 6 weight percent 1-hexene based on the total weight of monomers under polymerization conditions generally similar to those before. One half of the 1-hexene was added prior to starting the run, the remainder was added along with the ethylene required to maintain the desired pressure. Thus, an average 6 weight percent 1-hexene content based on total monomers was maintained throughout the run. When used, TEA or butylethylmagnesium (BEM) adjuvant was added to the reactor. The results were as follows:

TABLE V

| Run No. | Time, Minutes Induc. | Time, Minutes Total | Run Temp °C. | Metal Alkyl ppm. | Polymer Yield g | Polymer Density g/cc | Polymer Melt Index g/10 min. | Catalyst Prod. g/g Cat. | Calculated Average Catalyst Activity g/g Cat/hr |
|---|---|---|---|---|---|---|---|---|---|
| 1 | 38 | 98 | 102 | none | 202 | 0.9470 | 0.14 | 4300 | 2630 |
| 2 | 0 | 35 | 102 | 0.73 TEA | 134 | 0.9478 | 0.17 | 3150 | 5400 |
| 3 | 0 | 40 | 102 | 1.48 TEA | 207 | 0.9460 | 0.17 | 4480 | 6720 |
| 4 | 27 | 82 | 104 | none | 207 | 0.9482 | 0.42 | 4040 | 2960 |
| 5 | 0 | 40 | 104 | 0.82 TEA | 143 | 0.9476 | 0.33 | 3530 | 5300 |
| 6 | 18 | 68 | 104 | none | 203 | 0.9436 | 0.63 | 3940 | 3480 |
| 7 | 0 | 30 | 100 | 1.00 BEM | 187 | 0.9552 | 1.8 | 4140 | 8280 |

As can be seen, both the TEA and BEM gave massive improvements in activity.

EXAMPLE VI

A silica-titania-chromia tergel catalyst was prepared as generally disclosed for the cogel catalyst except that a water-soluble chromium compound was admixed with the titanium compound and acid. The final catalyst, dry basis, contained 1 weight percent chromium as chromium oxide and 2 weight percent titanium as titanium oxide. The catalyst was activated for 5 hours at 870° C. in dry air. About one-half of the weight of co-monomer was charged to the reactor prior to starting the run. The remainder was added along with the ethylene required to maintain the desired pressure during the first 20 minutes of the actual polymerization time. When used, BEM adjuvant was added to the reactor in the concentration shown. The results were as follows. Runs 1 and 2 were run at 550 psig while runs 3-6 were run at 350 psig.

TABLE VI

| Run No. | Time, Minutes Induction | Time, Minutes Total | Run Temp °C. | BEM Conc ppm. | Comonomer Name | Comonomer Wt. % In Feed | Polymer Yield g | Polymer Density g/cc | Polymer Melt Index g/10 Min | Catalyst Productivity g/g Cat | Calculated Average Catalyst Activity g/g Cat/hr |
|---|---|---|---|---|---|---|---|---|---|---|---|
| 1 | 30 | 70 | 100 | 0 | 1-hexene | 5.2 | 405 | 0.9468 | 3.0 | 7440 | 6380 |
| 2 | 0 | 30 | 100 | 1.0 | 1-hexene | 3.9 | 230 | 0.9466 | 3.0 | 4330 | 8660 |
| 3 | 16 | 91 | 90 | 0 | 1-octene | 5.4 | 176 | 0.9364 | 2.4 | 3830 | 2530 |
| 4 | 5 | 63 | 90 | 2.0 | 1-octene | 5.1 | 185 | 0.9348 | 0.89 | 4060 | 3870 |
| 5 | 50 | 130 | 85 | 0 | 1-octene | 3.8 | 189 | 0.9454 | 0.32 | 4375 | 2020 |
| 6 | 0 | 60 | 85 | 2.0 | 1-octene | 8.7 | 187 | 0.9412 | 0.14 | 3900 | 3900 |

In every instance, 1 or 2 ppm BEM addition improved catalyst activity. In runs 1, 2, it can be seen that at 1 ppm BEM and with 1-hexene as comonomer, both polymers made were substantially equivalent in melt index and density. The advantage of 1 ppm BEM lies in the greater catalyst activity coupled with little or no change in polymer properties.

In runs 3, 4 and 5, 6, the results indicate that 2 ppm BEM, while improving catalyst activity, depressed both polymer melt index and polymer density below that of the control polymers. This coupled with previous data shows that as little as 1 ppm or even 0.5 ppm and less have a dramatic effect on reducing the induction period and increasing activity with little effect on polymer properties. At the higher (but still very low) concentrations, the same beneficial effects in induction period and activity are achieved but polymer properties begin to be affected.

CONTROL EXAMPLE VII

A catalyst identical to that of Example I was utilized under identical polymerization conditions except that a solution of triethylborane (TEB) was employed as an adjuvant. The results were as follows:

TABLE VII

| Run No. | Time, Minutes Induction | Time, Minutes Total | TEB Conc ppm. | Polymer Yield g | Polymer Density g/cc | Polymer Melt Index g/10 min. | Catalyst Productivity g/g Cat | Calculated Average Catalyst Activity g/g Cat/hr |
|---|---|---|---|---|---|---|---|---|
| 1 | 8 | 53 | 0 | 171 | 0.9664 | 4.3 | 4090 | 4630 |
| 2 | 0 | 48 | 0.29 | 165 | 0.9658 | 4.2 | 4090 | 5110 |
| 3 | 0 | 50 | 0.49 | 167 | 0.9658 | 3.5 | 3850 | 4620 |
| 4 | 0 | 50 | 1.00 | 175 | 0.9654 | 3.3 | 4300 | 5160 |

Addition of TEB generally results in depressing both polymer melt index and density slightly with little improvement in activity. This shows that not just any metal alkyl will function at low concentrations to both decrease the induction period and increase activity significantly. This is consistent with Control Run 4 of Example IV.

Tests with diethylzinc show that alkylzinc compounds are also ineffective to improve activity in the concentration range used with the other metal alkyls.

While this invention has been described in detail for the purpose of illustration, it is not to be construed as limited thereby but is intended to cover all changes and modifications within the spirit and scope thereof.

We claim:

1. A polymerization process comprising contacting a monomer system comprising predominantly ethylene in a liquid hydrocarbon diluent under slurry polymerization conditions with a catalyst comprising chromium oxide supported on a silica-containing material, in the presence of a treating agent comprising (1) an organoaluminum compound selected from alkylaluminum compounds or alkylaluminum hydride compounds or (2) a dihydrocarbylmagnesium compound, said treating agent being present in an amount within the range of 0.2 to 1 parts by weight per million parts by weight of said diluent, said amount being an effective amount to reduce the induction period.

2. A process according to claim 1 wherein said monomer system consists essentially of ethylene and said treating agent is present in an amount within the range of 0.3 to 0.7 part by weight per million parts by weight of said diluent.

3. A method according to claim 1 wherein said monomer system comprises 93 to 99.6 weight percent ethylene, the remainder being at least one $C_3$ to $C_{10}$ olefin.

4. A method according to claim 1 wherein said treating agent is a trialkylaluminum compound.

5. A method according to claim 4 wherein said treating agent is triethylaluminum.

6. A method according to claim 1 wherein said diluent is isobutane.

7. A method according to claim 1 wherein said support is a silica-titania cogel.

8. A method according to claim 1 wherein said treating agent is present in an amount within the range of 0.3 to 0.7 part by weight per million parts by weight of said diluent.

9. A method according to claim 1 wherein said treating agent is present in an amount within the range of 0.3 to 0.7 part by weight per million parts by weight of said diluent, said treating agent is one of triethylaluminum or n-butylethylmagnesium, said support is a silica-titania cogel, said chromium oxide is present in an amount of about 1 weight percent based on the weight of said support, said diluent is isobutane, and said polymerization process is carried out at a temperature within the range of 60°–110° C.

10. A polymerization process comprising contacting a monomer system comprising predominantly ethylene in a liquid hydrocarbon diluent under slurry polymerization conditions with a catalyst comprising chromium oxide supported on a silica-containing material, in the presence of a treating agent comprising a dihydrocarbylmagnesium compound, said dihydrocarbylmagnesium compound being present in an amount within the range of 0.2 to 1 part by weight per million parts by weight of said diluent.

11. A method according to claim 10 wherein said treating agent is n-butylethylmagnesium.

* * * * *